D. A. DANFORTH.
Driven-Well Point.
No. 163,749.  Patented May 25, 1875.
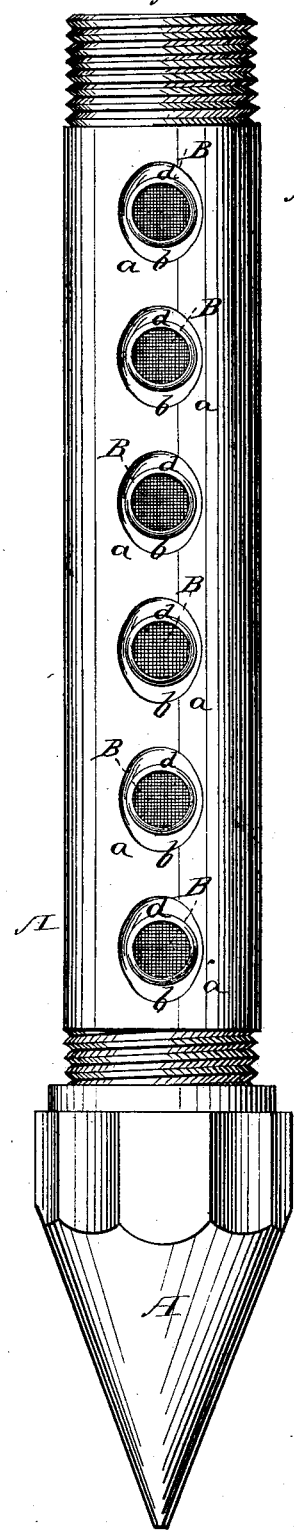
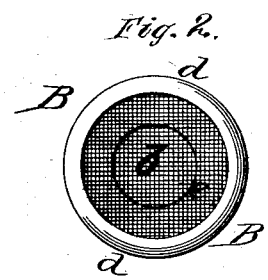
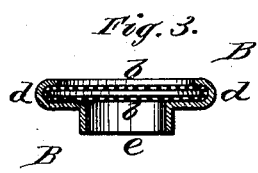
Witnesses: P. C. Dieterich, W. C. McArthur.
Inventor: D. A. Danforth per J. H. Alexander, Attorney.

UNITED STATES PATENT OFFICE

DELOSS A. DANFORTH, OF ELKHART, INDIANA.

IMPROVEMENT IN DRIVEN-WELL POINTS.

Specification forming part of Letters Patent No. 163,749, dated May 25, 1875; application filed April 8, 1875.

*To all whom it may concern:*

Be it known that I, DELOSS A. DANFORTH, of Elkhart, in the county of Elkhart and State of Indiana, have invented certain new and useful Improvements in Drive-Well Points; and I do hereby declare that the following is a full, clear, and exact description thereof, reference being had to the accompanying drawings and to the letters of reference marked thereon, which form part of this specification.

My invention relates to that class of well-points which are provided with a number of holes or apertures, to be covered with wire-gauze to form a filter; and the nature of my invention consists in the construction of the filter, and in the mode of attaching the same to the well-point, as will be hereinafter more fully set forth.

In order to enable others skilled in the art to which my invention appertains to make and use the same, I will now proceed to describe its construction and operation, referring to the annexed drawing, in which—

Figure 1 is a side elevation of a drive-well tube provided with my improved filter, and Figs. 2 and 3 are detail views of said filter.

A represents an ordinary well-point or well-tube, provided with a number of holes or apertures $a\ a$, which are countersunk on the outside of the tube. In each of these holes is inserted and fastened a filter, B, formed in the shape of a button, consisting of a piece of wire-gauze, $b$, doubled and cut round or in suitable form. A piece of sheet metal, $d$, is spun or otherwise fastened around the edges of the wire-gauze $b$, to hold the same firmly, and on one side the sheet metal is formed into a collar or hollow shank, $e$, thus completing the button, said collar or shank being the same size as the aperture $a$ in the well-tube.

The filter thus constructed is inserted from the inside of the tube A, with the collar or shank $e$ projecting through the aperture $a$. The collar is then, by a suitable tool, spread or riveted in the countersink around said aperture, thereby fastening the filter firmly in place.

By the wire-gauze being double the filter is made stronger and finer than if the gauze is left single.

The buttons B, or any of them, can easily be removed, if required, in case of breakage, and others substituted.

Having thus fully described my invention, what I claim as new, and desire to secure by Letters Patent, is—

1. A well-point filter made in the form of a button, of wire-gauze $b$, sheet-metal rim $d$, and collar or hollow shank $e$, substantially as and for the purpose herein set forth.

2. The combination of the well-tube A, provided with countersunk apertures $a\ a$, and the filters B B, made in the form of buttons, and riveted in the countersinks, substantially in the manner and for the purposes herein set forth.

In testimony that I claim the foregoing as my own I affix my signature in presence of two witnesses.

DELOSS A. DANFORTH.

Witnesses:
S. E. BARNEY,
W. M. BARNEY.